United States Patent Office 3,314,540
Patented Apr. 18, 1967

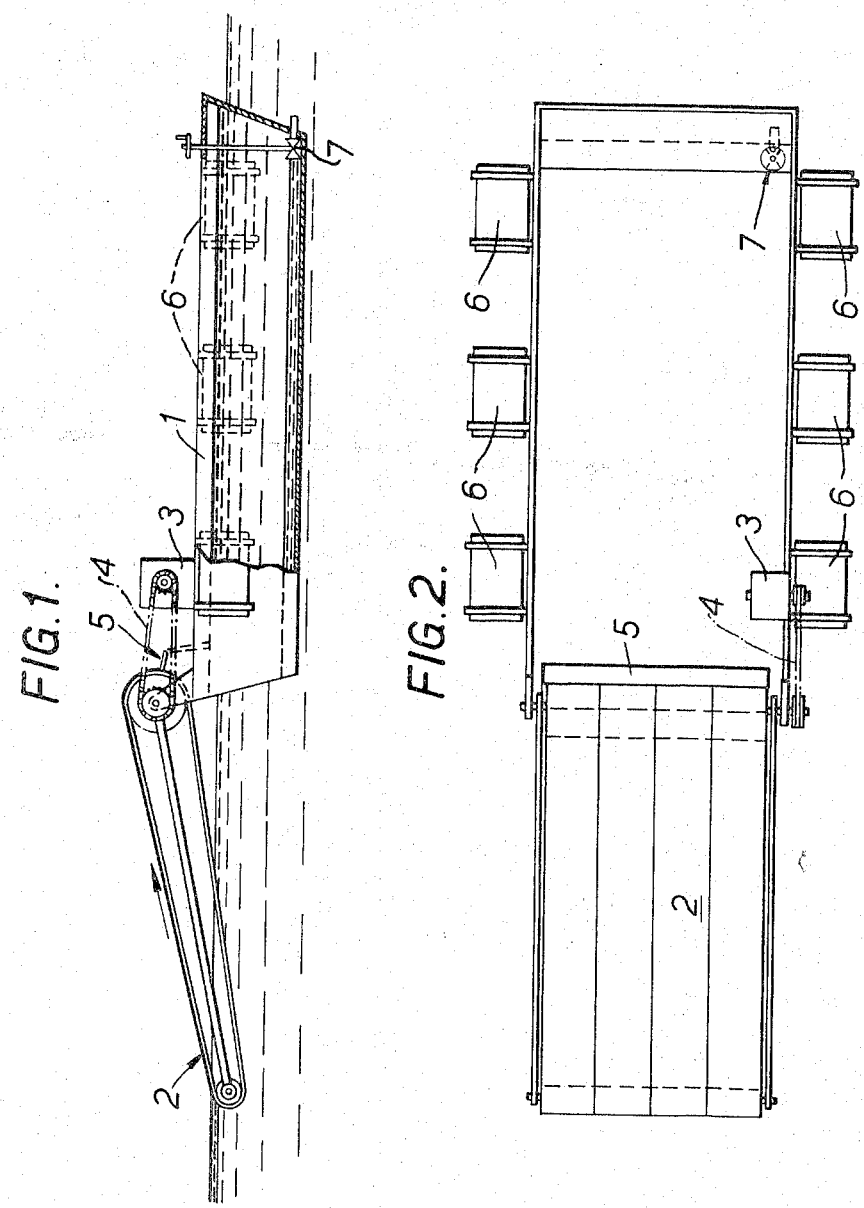

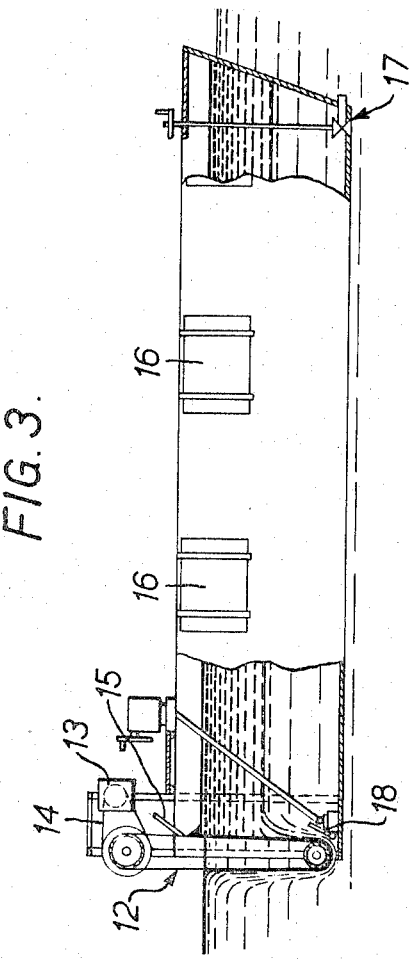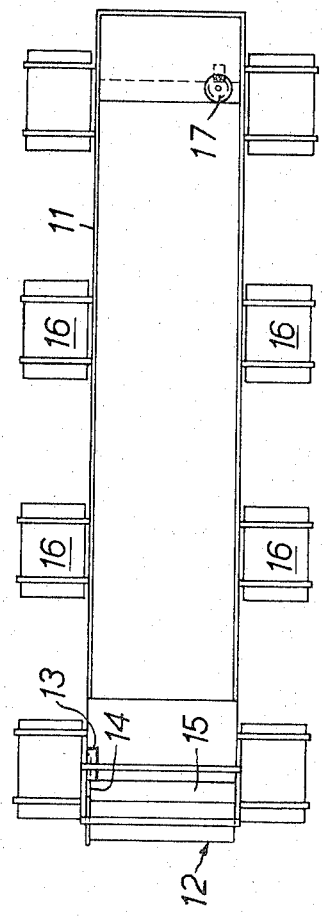

3,314,540
REMOVAL OF OIL FILMS FROM WATER
Edward James Lane, London, England, assignor to The British Petroleum Company Limited, London, England, a British joint-stock corporation
Filed July 5, 1963, Ser. No. 292,830
Claims priority application Great Britain, July 13, 1962, 27,002/62; Sept. 5, 1962, 34,031/62
2 Claims. (Cl. 210—77)

This invention relates to the removal of oil films from water and particularly to the removal of floating patches of relatively heavy oils from large expanses of water, for example rivers, lakes and the sea.

The accidental pollution of waterways, harbours and coastal waters is a serious problem which arises from time to time when a substantial quantity of a relatively heavy oil, for example crude oil or fuel oil, escapes onto the water, for example due to a leaking tank or pipeline or accidental discharge from ships. Clearing the water of this oil is a different operation even when the oil is contained within floating booms.

It has been proposed to remove oily material from water surfaces by means of an endless belt driven around two rollers, one roller being immersed in the oil-covered water and the other roller being mounted on board a craft such as a barge so that on driving the belt, oil is transferred from the water into the barge. One of the problems associated with this method, however, is the quantity of water transferred with the oil into the barge.

According to the present invention a device for recovering oil from the surface of water comprises, in combination, an oil pick-up and transfer member and a receptacle for transferred oil incorporated in, or comprising, a craft, the base of the receptacle being at least partially open to the water.

The oil pick-up and transfer member may comprise a rotatable drum or, preferably, an endless belt, the belt being supported on two drums arranged so that, when the craft is afloat, one drum will be at least partially immersed in the water, the other drum being mounted aboard the craft.

The receptacle preferably comprises substantially the craft itself and the base of the craft may be entirely open to the water so that, in effect, the craft becomes a floating boom, but preferably the base is only partially open, for example through one or more holes or pipes which are preferably closable by means of cocks. Since the craft is open at the base it will, of course, be necessary to maintain the craft afloat, for example by buoyancy tanks.

In the device of the present invention the liquid level inside the craft is maintained at a similar level to the water level outside. As oil is transferred via the belt into the craft, water is displaced through the base of the craft. Moreover, much of any water which is introduced into the craft with oil on the belt settles out below the oil and is also displaced through the base. The displacement of water in this manner allows a greater quantity of oil to be accumulated in the device of the present invention than in the normal type of collecting barge which is not open to the water. If the openings in the base are closable, the craft may be charged with oil until oil starts to escape through the base i.e. when the oil-water interface reaches the base. The openings may then be closed and the craft driven or towed away so that the oil may be pumped to storage. If, however, the base is fully open or the openings are not closable, transfer of oil into the craft must be halted when the oil-water interface is still some way from the base otherwise when the craft is moved there will be a tendency for oil to be sucked out of the base, thereby escaping once again onto open water surface. The amount of water which must be left in the craft will depend on a number of factors including the number and position of the openings and the roughness of the water surface.

The transfer of the oil from the surface of the water to the surface of the belt is dependent on the fact that the surface tension of a drop of water in contact with the belt is greater than that of a drop of oil in contact with the belt and, consequently that oil has a greater tendency to spread over the surface of the belt and to adhere to it. The actual material of the belt may be chosen accordingly and one example of a suitable material is a woven cotton fabric coated with neoprene.

The belt may be mounted at the bow of a suitable craft, for example a self-propelled barge or pontoon, although more than one belt may be employed if required, mounted on other sides of the craft. The belt may be driven so that either its oil-carrying surface moves directly out of the water into the craft or so that its oil-carrying surface moves down through the water and into the craft. If driven so that the oil-carrying surface moves directly out of the water, the belt is preferably maintained at an angle with the water which is sufficiently small to minimise any tendency of the oil to run off the belt back into the water. If, however, the belt is driven so that the oil-carrying surface moves through the water towards the craft, the belt may be maintained at any angle with the water of up to or even greater than 90°. The speed at which the belt is driven may be adjusted in each case to give the maximum transference of oil from the water surface to the belt.

Surprisingly, it has been found that better oil transference is obtained by driving the belt so that oil is carried downwardly through the water than by driving the belt in the other direction. While the reason for this is not entirely clear, it appears that less water is entrained with the oil and therefore there is less water to run off the belt on its upward path, this water normally tending to carry oil with it back onto the main water surface. Moreover, it is believed that the pressure of the surrounding water tends to hold the oil onto the face of the belt. It is, therefore, a preferred feature of the present invention that the belt be driven in this direction.

The belt is provided with a suitable device, for example a scraper or roller to remove any oil from the belt and to direct this oil into the craft for storage. When the belt is set in motion a clear patch of water forms in front of the belt, the oil having been removed therefrom. Even if the craft remains stationary some oil will still be transferred to the belt via the edges of the belt to which the clear patch does not extend, although it is clearly more efficient to propel the craft so as to maintain the whole width of the belt in contact with oil-covered water or else to surround the patch of oil by a floating boom which can be pulled in to maintain the layer of oil in contact with the belt.

Preferably, the belt is mounted on two drums viz. a belt driving drum and a belt idler drum. The driving drum may be mounted on a shaft supported by brackets fixed in the bows of the craft and the shaft may be driven by any suitable means, for example, a diesel engine. This shaft may also carry the ends of a suitable framework which supports the belt idler drum, the ends of the framework being free to rotate about the shaft. The idler drum may suitably comprise a hollow sealed vessel of sufficient buoyancy to float either partially or wholly submerged in the water. As the ends of the framework are free to rotate about the shaft, the idler drum will remain in the water despite any "pitching" of the craft. When however, the belt is mounted on the craft so as to be substantially vertical to the water, the belt may conveniently be rigidly mounted to the craft. Where the oil-carrying surface of the belt is driven through the water, the space between the surface of the belt nearest to the craft and the craft itself is preferably enclosed at the sides. In this way any oil which does escape from the belt, instead of escaping again to the open water, will fall back into the enclosed space between the craft and the inner side of the belt where it will recontact the belt surface and be transferred to the craft.

In a particularly preferred form of the present invention the belt forms the end of the craft itself with a space between the bottom end of the belt and the base of the craft so that oil is swept downwardly through the water and directly into the craft immediately upon rounding the lower drum on which the belt is supported. In addition to the oil which actually adheres to the surface of the belt, a certain amount of oil is swept downwardly in the form of a current close to, but not actually adhering to, the surface of the belt. In the particularly preferred form of the invention this current is swept around the bottom drum and into the craft. Preferably the space between the base of the craft and the belt is closable, for example by a suitable mechanically operable metal flap.

The craft may be propelled through the oil-covered water and the belt set in motion. Oil, together with a relatively small quantity of entrained water, is transferred to the belt as it rotates and, accordingly to the particular embodiment of the invention being employed, is partially swept directly into the craft, the remainder being removed by the scraper or roller, or alternatively it is entirely removed by the scraper or roller, and collected inside the craft.

The invention includes a method for removing oil from water surfaces comprising driving an endless belt through the oil covered water and thereby transferring oil into a craft, the base of which is at least partially open to water. The belt is preferably driven so that the oil-carrying surface passes downwardly through the water before transferring oil inboard. Other preferred modes of operation are described above with reference to the apparatus.

The invention is illustrated with reference to the accompanying drawings, FIGS. 1 to 4.

FIG. 1 is a side elevation of one embodiment of the present invention. FIG. 2 is a plan view of the embodiment shown in FIG. 1.

FIG. 3 is a side elevation of a preferred embodiment of the present invention. FIG. 4 is a plan view of the embodiment shown in FIG. 3.

In FIGS. 1 and 2 upon barge 1 is mounted an endless belt indicated generally at 2. The belt is connected to motor 3 by chain drive 4. Scraper 5 is mounted against the belt. The barge is maintained afloat by buoyancy tanks 6. The base of the barge is open to the water via cock 7.

The barge 1 is propelled into the oil-covered water and the belt is set in motion in a clockwise direction looking at FIG. 1. Oil, with some water, adheres to the belt and is carried inboard to be removed from the belt by scraper 5 and directed into the body of barge 1. As the oil is transferred into the barge, water is displaced from the barge via cock 7. When oil begins to escape from cock 7, the belt is stopped and cock 7 is closed. The barge is then driven away so that the oil may be pumped ashore.

In FIGS. 3 and 4 barge 11 has mounted upon it an endless belt indicated generally at 12 which forms the forward end of barge 11. The belt is contacted to motor 13 by belt drive 14. Scraper 15 is mounted against the belt. The barge is maintained afloat by buoyancy tanks 16. The base of the barge is open to the water via cock 17 and at the bottom of the belt. The opening at the bottom of the belt can be closed by mechanically operated flap 18.

The belt is set in motion in an anti-clockwise direction looking at FIG. 3. Oil is swept into the craft through the opening at the bottom of the belt, water being displaced through cock 17. When oil begins to escape from cock 17, the belt is stopped, cock 17 is closed and the opening at the bottom of the belt is also closed by flap 18. The barge is then driven away and the oil pumped ashore.

I claim:
1. The method of recovering oil from the surface of water and transferring it to a craft having a receptacle in the craft for the transferred oil, comprising maintaining the craft afloat in the water, maintaining the base of the receptacle at least partially open to the water, forming one end of the craft with a substantially vertically positioned endless belt having one face thereof partially immersed in the water and having the other face thereof open to the receptacle, forming the operative surface of the belt of a material to which oil adheres, maintaining an opening in the craft between the bottom end of the belt and the base of the receptacle for the transference of oil thereinto, driving the belt so that the partially immersed belt face moves downwardly through the water and upwardly through the opening for transferring oil into the receptacle and causing the removed oil to flow into the receptacle.

2. A craft for recovering oil from the surface of water, comprising buoyancy means connected to said craft for maintaining it afloat in the water, a receptacle in said craft for the transferred oil having a base at least partially open to the water, a substantially vertically positioned endless belt connected to and forming one end of said craft and having one face thereof partially immersed in the water and having the other face thereof open to said receptacle, and wherein the operative surface of said belt is of a material to which oil adheres, means providing an opening in said craft between the bottom end of said belt and the base of said receptacle for the transference of oil thereinto, means connected to said belt for driving said belt so that said partially immersed belt face moves downwardly through the water and upwardly through said opening for transferring oil into said receptacle, and means within said craft for removing oil from said belt face open to said receptacle and for causing said removed oil to flow into said receptacle.

References Cited by the Examiner
UNITED STATES PATENTS

| | | | |
|---|---|---|---|
| 1,860,819 | 5/1932 | Schamberger | 210—523 |
| 2,470,418 | 5/1949 | Verner | 210—523 |
| 2,876,903 | 3/1959 | Lee | 210—242 |
| 2,908,393 | 10/1959 | Lanphier | 210—242 |
| 3,146,192 | 8/1964 | McClintock | 210—525 X |
| 3,219,190 | 11/1965 | Thune | 210—242 |

SAMIH N. ZAHARNA *Primary Examiner.*